Nov. 15, 1932.   R. C. CROSS   1,887,997
VALVE FOR INTERNAL COMBUSTION ENGINES AND PUMPS
Filed Oct. 28, 1931   2 Sheets-Sheet 1
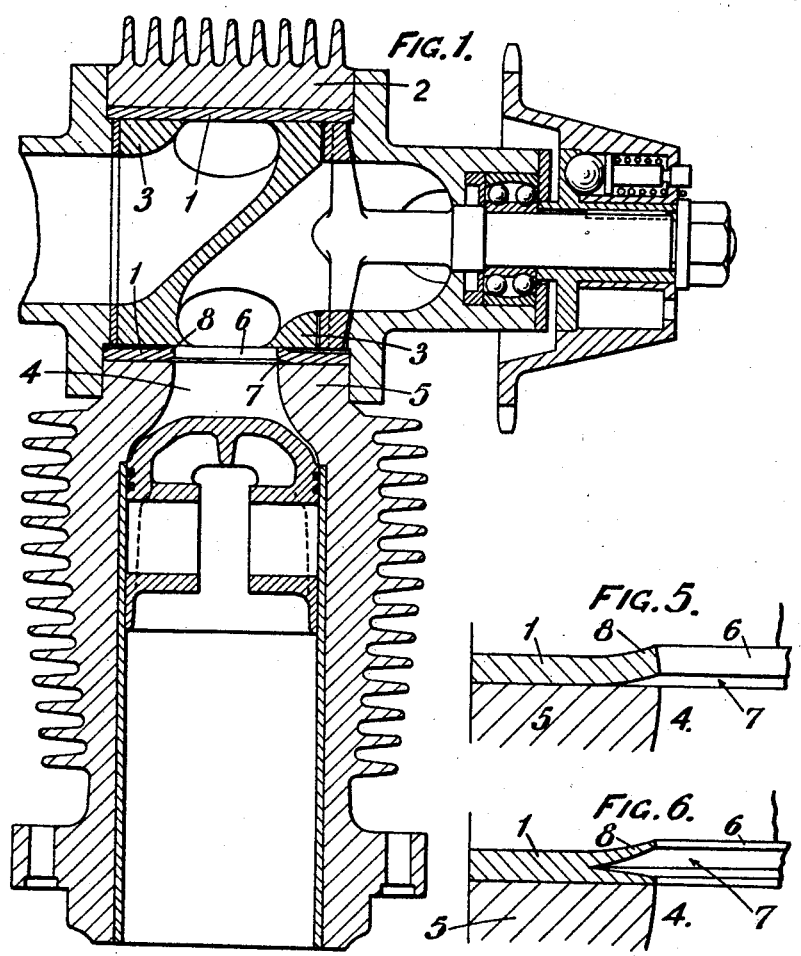
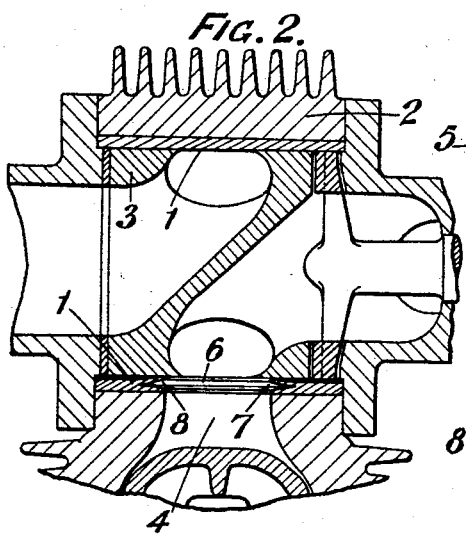
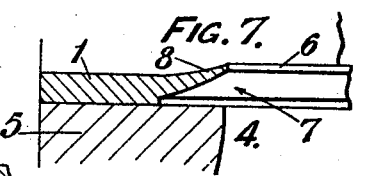
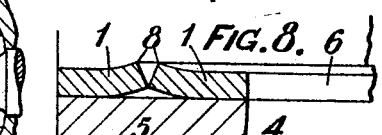
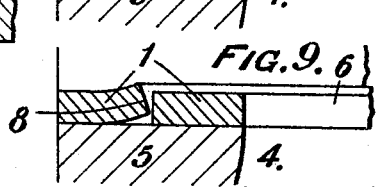
INVENTOR
ROLAND C. CROSS
By (signature) Atty.

Nov. 15, 1932.  R. C. CROSS  1,887,997
VALVE FOR INTERNAL COMBUSTION ENGINES AND PUMPS
Filed Oct. 28, 1931    2 Sheets-Sheet 2
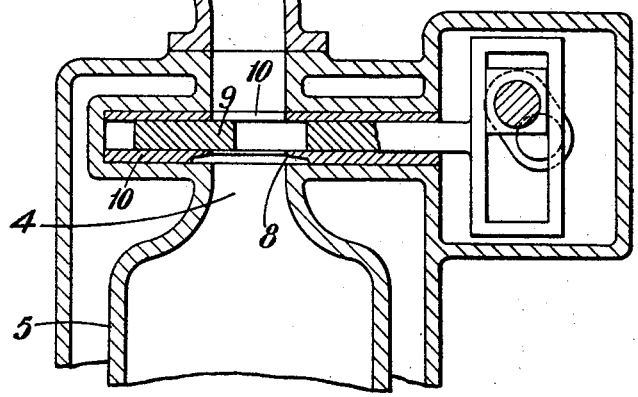
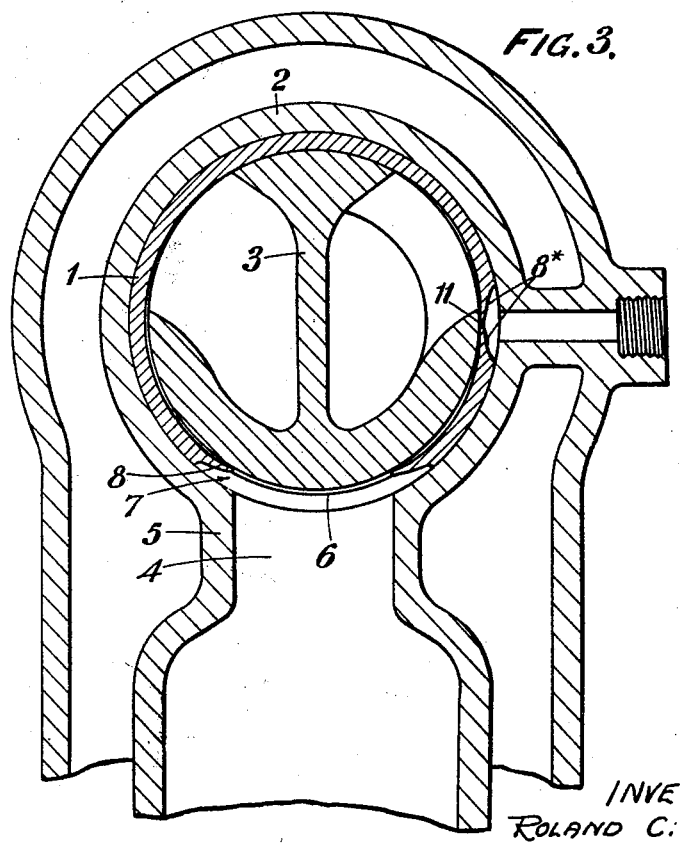
INVENTOR
ROLAND C. CROSS Patented Nov. 15, 1932

1,887,997

UNITED STATES PATENT OFFICE

ROLAND CLAUDE CROSS, OF BATH, ENGLAND

VALVE FOR INTERNAL COMBUSTION ENGINES AND PUMPS

Application filed October 28, 1931, Serial No. 571,624, and in Great Britain February 2, 1931.

This invention relates to valve assemblies of the sliding kind, which includes rotary, sleeve, slide and other valves in which the wall of the valve is used to control the opening and closing of a port or ports in the bearing element of the valve chamber by sliding contact, either rotary, reciprocal or a combination of both. An important application of the invention is to rotary valves disposed at the cylinder head of an internal combustion engine or pump.

The said invention has for its object to enable rotary and other sliding valves to be used efficiently by removing the chief disadvantages which exist in such types, viz:—
(a) pressure leakage between the valve and its bearing, (b) poor lubrication or extravagant wastage of lubricant. By the present invention the leakage is reduced to negligible proportions notwithstanding that the usual necessary clearance between the relatively sliding parts is maintained, and adequate lubrication may be employed without risk of wasteful flooding.

Broadly, according to the said invention, the new method of sealing rotary and other sliding valves against leakage of gas, lubricant or other fluid from a port or ports in the valve or its casing along and between the working faces of the valve and its bearing, consists in forming a resilient lip integrally as part of a liner constituting a bearing for the valve.

For example, a rotary valve according to the invention may be formed with inlet and outlet ports co-acting with a port or ports in the valve chamber, and the latter provided with a fixed cylindrical liner constituting the bearing element, said liner being formed with a port or ports in register with the valve chamber ports, the ports in the liner having resilient margins pressing on to the rotary valve element. The thickness of the leak-proof resilient lip may vary across the width thereof being thinnest at the free edge so as to increase the flexibility of the lip.

From the foregoing a general understanding of the invention will have been gained, and in order that the same may be more clearly understood reference is directed to the following description of some particular embodiments, by way of example, illustrated by the accompanying drawings, in which:—

Figure 1 is a vertical section of an internal combustion engine fitted with a rotary valve controlling the inlet and exhaust of the cylinder according to the invention;

Figure 2 is a vertical section of a similar arrangement according to a modification;

Figure 3 is a transverse section of a water-cooled example of an internal combustion engine, according to a further modification;

Figure 4 shows the invention, in one of its forms, applied to a reciprocal slide valve;

Figures 5—9 are details, to a larger scale, of sealing lips hereinafter referred to, all shown on a flat plane for convenience.

In Figures 1 to 3, there is provided a thin bush 1, which is pressed or otherwise fastened into the valve housing 2, and in which the valve 3 rotates to perform its work of opening and closing the port 4 in the cylinder or cylinder head 5. This bush 1 has a hole 6 in its wall to register with the port 4, and the said bush, at that part of it which forms the periphery of the said hole, and for some distance all round it is shaped with a lip 8 so as to press slightly inwards towards the working face of the valve 3, so that the edge of the said hole is resiliently pressed against the wall of the said valve. By so pressing the bush 1 inwards toward the valve 3 adjacent to the edge of the said port 4, a slight gap 7 is produced between the said bush 1 and the valve housing 2. This permits of the gas pressure in the said cylinder to get underneath the said bush for a short distance adjacent to the port, thereby further tending to press the said edge of the bush against the said valve. This means that the valve is enabled to have a good working clearance in the bush, and that whatever position the valve assumes in the clearance of the bush, the said edge or lip 8 of the bush will resiliently follow the surface of the said valve, thereby making it sufficiently gas tight for all practical purposes.

The clearance between the valve 3 and the bush 1 is necessarily greatly exaggerated in Figures 1—3 to show the deflected lip 8, but obviously for all practical purposes the lip may be regarded as having been pressed substantially back to the plane of the working surface of the bush when in assembled position.

The lip 8 may be simply a resilient deflection of the margin of the port orifice 6, as in Figures 1 and 5, or may be thinned by slitting or V-cutting as in Figures 2 and 6, or by chamfering as in Figures 3 and 7. The latter form is shown also as the example in Figure 4 where the invention is applied to a reciprocal slide valve 9 working between bearing faces 10 which are the equivalent of the bush 1.

Figures 8 and 9 show examples wherein the lip is set back from the margin of the port, but encircling or circumscribing the port boundary as in the other illustrated cases.

An oil hole or oil holes or ports 11 may be cut in the surface of the bush 1, such oil holes communicating with the oil supply, the edges of the said oil holes being pressed inwards as lips 8* so as resiliently to press against the surface of the valve. This allows the oil to be wiped on to the valve in a thick film, but at the same time, does not allow the oil to escape so freely into the clearance between the valves and the bush 1 so as to be wasteful. The said oil holes would, for preference, be elongated in shape.

The liner 1 or 10 may be a composite member to ensure a good bearing metal at one side and a more elastic metal at the other. For example a bush of high tensile steel could be formed with a thin bearing face of white metal.

I claim:

1. A valve assembly comprising a valve housing having a port, a valve having a port for cooperation with said housing port, a valve bearing element interposed between the valve and the housing and having a port alined with the housing port, and a resilient lip integral with the bearing element, surrounding the port therein, and tending to project into the space occupied by the valve whereby it seals fluid tight against the valve.

2. A valve assembly as set forth in claim 1 in which the lip has an unbroken free edge.

3. A valve assembly comprising a valve housing having a port, a cylindrical valve bearing element disposed within said housing and having a port alined with the housing port, a cylindrical valve within said bearing element provided with a port for cooperation with the housing and bearing element ports, and a resilient lip integral with said bearing element, surrounding the port therein, and tending to project at its free edge into the interior of the bearing element whereby it seals fluid tight against the valve.

4. A valve assembly as set forth in claim 3 in which the lip has an unbroken free edge.

5. A valve assembly comprising a valve housing, a valve therein, a valve bearing element interposed between the valve and the housing, said valve bearing element having an opening, and resilient lip integral with said bearing element, surrounding the opening therein, and tending to project into the space occupied by the valve whereby it seals fluid tight against the valve.

6. A valve assembly as set forth in claim 5 in which the lip has an unbroken free edge.

7. A valve assembly as set forth in claim 1 in which the lip is of decreasing thickness towards its free edge to increase its flexibility.

8. A valve assembly as set forth in claim 1 in which the lip is constituted by a portion of the valve bearing element of less thickness than said bearing element.

9. A valve assembly as set forth in claim 1 in which the lip is constituted by the entire portion of the bearing element immediately surrounding the port therein.

10. A valve assembly as set forth in claim 1 in which the lip is formed by a slit extending into the bearing element from the port therein.

In witness whereof I have signed this specification.

ROLAND CLAUDE CROSS.